US012461281B2

(12) United States Patent
Tamura et al.

(10) Patent No.: US 12,461,281 B2
(45) Date of Patent: Nov. 4, 2025

(54) ANTI-REFLECTIVE FILM LAMINATE AND PRODUCT PROVIDED WITH SAME

(71) Applicant: DEXERIALS CORPORATION, Shimotsuke (JP)

(72) Inventors: Takashi Tamura, Shimotsuke (JP); Tadaaki Toyoshima, Shimotsuke (JP); Yuji Kato, Shimotsuke (JP); Hiroki Inoue, Shimotsuke (JP); Takayuki Hisa, Shimotsuke (JP); Yunosuke Fujita, Shimotsuke (JP)

(73) Assignee: DEXERIALS CORPORATION, Shimotsuke (JP)

( * ) Notice: Subject to any disclaimer, the term of this patent is extended or adjusted under 35 U.S.C. 154(b) by 540 days.

(21) Appl. No.: 17/911,718

(22) PCT Filed: Mar. 26, 2021

(86) PCT No.: PCT/JP2021/012932
§ 371 (c)(1),
(2) Date: Sep. 15, 2022

(87) PCT Pub. No.: WO2021/200678
PCT Pub. Date: Oct. 7, 2021

(65) Prior Publication Data
US 2023/0111821 A1    Apr. 13, 2023

(30) Foreign Application Priority Data
Mar. 31, 2020    (JP) .................................. 2020-063354

(51) Int. Cl.
*G02B 1/11*    (2015.01)
*B32B 7/022*    (2019.01)
(Continued)

(52) U.S. Cl.
CPC ................ *G02B 1/11* (2013.01); *B32B 7/022* (2019.01); *B32B 7/023* (2019.01); *B32B 7/12* (2013.01);
(Continued)

(58) Field of Classification Search
CPC .. G02B 1/11; G02B 1/115; G02B 1/14; G02B 1/18; B32B 7/022; B32B 7/023; B32B 7/12
See application file for complete search history.

(56) References Cited

U.S. PATENT DOCUMENTS

2002/0149708 A1    10/2002    Nagata et al.
2006/0257590 A1    11/2006    Nakamura
2019/0094604 A1    3/2019    Inque et al.

FOREIGN PATENT DOCUMENTS

JP    H10-86264 A    4/1998
JP    2004021550 A    1/2004
(Continued)

OTHER PUBLICATIONS

2007328092 A (Takano Motomine) machine translation (Year: 2007).*
(Continued)

*Primary Examiner* — James A Dudek
(74) *Attorney, Agent, or Firm* — Element IP, PLC (57) ABSTRACT

An anti-reflective film laminate includes a first transparent base material, an antireflective layer, and an adhesion layer. The first transparent base material is a plastic film and has a first surface and a second surface which is a surface on a back side with respect to the first surface. The anti-reflective layer includes a hard coat layer, an inorganic multilayer film layer, and an antifouling layer provided in order on the first surface. The adhesion layer is provided on the second surface. The adhesion layer consists of two adhesive layers
(Continued)

and a second transparent base material sandwiched between the two adhesive layers and directly adhering to each of the two adhesive layers. A reflectance of the anti-reflective film laminate is 0.8% or less when light with a wavelength of 380 nm to 780 nm is incident. A breaking force of the anti-reflective film laminate is 5.7 N or more.

10 Claims, 3 Drawing Sheets

(51) Int. Cl.
    *B32B 7/023*     (2019.01)
    *B32B 7/12*     (2006.01)

(52) U.S. Cl.
    CPC ..... *B32B 2250/05* (2013.01); *B32B 2307/412* (2013.01); *B32B 2307/418* (2013.01); *B32B 2307/536* (2013.01); *B32B 2307/732* (2013.01); *B32B 2315/08* (2013.01); *B32B 2367/00* (2013.01); *B32B 2457/20* (2013.01); *B32B 2605/08* (2013.01)

(56) References Cited

FOREIGN PATENT DOCUMENTS

| | | | |
|---|---|---|---|
| JP | 2004126220 A | | 4/2004 |
| JP | 2005140863 A | | 6/2005 |
| JP | 2005178173 A | | 7/2005 |
| JP | 2007328092 A | | 12/2007 |
| JP | 2011209512 A | | 10/2011 |
| JP | 2013177485 A | | 9/2013 |
| JP | 2015030154 A | | 2/2015 |
| JP | 2015171770 A | | 10/2015 |
| JP | 2017071730 A | | 4/2017 |
| JP | 2018101117 A | | 6/2018 |
| JP | 2019018393 A | | 2/2019 |
| JP | 2019028364 A | * | 2/2019 |
| KR | 20170042509 A | | 4/2017 |
| WO | WO-2002009976 A1 | | 2/2002 |
| WO | WO-2017010483 A1 | | 1/2017 |
| WO | WO-2017208995 A1 | | 12/2017 |

OTHER PUBLICATIONS

JP 2019028364 A (Takami yoshifumi et al.) (Year: 2019).*
Combined Chinese Office Action and Search Report issued Oct. 28, 2023 in Chinese Patent Application No. 202180023422.9 (with English translation), 16 pages.
Office Action issued Oct. 3, 2023 in Japanese Patent Application No. 2021-015178 (with English translation), 8 pages.
Office Action issued Jan. 3, 2025, in corresponding Korean Patent Application No. 10-2022-7031058 (with machine English translation), 12 pages.
"Standard Test Method for Index Puncture Resistance of Geomembranes and Related Products" ASTM D4833-07, 2020, pp. 1-4.
Ikeda et al., "Puncture resistance of geomembrans and geotextile for protection with sharp nail", Geosynthetics Engineering Journal, vol. 16 (Dec. 2001), pp. 191-198 (with partial English translation).
Office Action issued Aug. 25, 2020 in Japanese Patent Application No. 2020-063354 (with English translation), 10 pages.
Office Action issued Nov. 16, 2021 in Japanese Patent Application No. 2020-63354 (with English translation), 14 pages.
Office Action issued Nov. 4, 2020 in Japanese Patent Application No. 2020-063354 (with English translation), 8 pages.
Written Opinion issued Apr. 20, 2021 in PCT/JP2021/012932 (with English translation), 10 pages.
International Search Report issued Apr. 20, 2021 in PCT/JP2021/012932 (with English translation), 7 pages.
Korean Office Action issued Sep. 1, 2023 in Patent Application No. 10-2022-7031058 (with English translation), 11 pages.
Combined Office Action and Search Report issued Mar. 6, 2024 in Chinese Patent Application No. 2021800234229 (with English translation), 19 pages.
Office Action issued May 14, 2024 in corresponding Chinese Patent Application No. 202180023422.9 (with English translation), 13 pages.
Office Action issued May 21, 2024 in corresponding Japanese Patent Application No. 2021-015178 (with English translation), 13 pages.
Office Action issued May 3, 2024 in corresponding Korean Patent Applicaiton No. 10-2022-7031058 (with English translation), 15 pages.
Office Action issued Dec. 11, 2023 in Indian Patent Application No. 202217055247, 8 pages.
Office Action issued Jan. 23, 2024 in Japanese Patent Application No. 2021-015178 (with English translation), 9 pages.
Office Action issued Jul. 26, 2024, in corresponding Indian Patent Application No. 202217055247, 2 pages.

* cited by examiner

ANTI-REFLECTIVE FILM LAMINATE AND PRODUCT PROVIDED WITH SAME

TECHNICAL FIELD

The present invention relates to an anti-reflective film laminate, and more particularly to an anti-reflective film laminate that is suitably used in combination with a display or the like provided in the interior or the like of a transportation machine such as an automobile.

Priority is claimed on Japanese Patent Application No. 2020-063354, filed Mar. 31, 2020, the content of which is incorporated herein by reference.

BACKGROUND ART

In order to handle a large amount of information, a display using a liquid crystal panel or the like has come to be used frequently in the cockpit or the like of a transport machine such as an automobile. An anti-reflective film has been used in a display from the standpoint of improving visibility and the like.

On the other hand, it is known that when a display is used in the cockpit of a transportation machine, it is necessary to deal with events in which the head of a passenger hits the display due to impact in the event of an accident or the like and the passenger is injured by broken glass. Proposals to devise a bonding structure of cover glass used for a display, to improve the installation structure of the display, and the like have been made.

CITATION LIST

Patent Document

[Patent Document 1]
PCT International Publication No. WO 2017/208995
[Patent Document 2]
PCT International Publication No. WO 2002/009976

SUMMARY OF INVENTION

Technical Problem

With respect to these proposals, providing an optical film such as an anti-reflective film with an adhesion layer, and attaching the optical film to the display to prevent a display surface from scattering and to curb the broken glass from protruding from a fracture surface, that is, the occurrence of sharp edges in the event of an accident or the like, to thereby protect the passenger while improving visibility, can be considered.

However, the present inventors have found that simply attaching the anti-reflective film to the cover glass of the display surface via an adhesive layer is insufficient to curb the occurrence of sharp edges.

Furthermore, the present inventors have performed extensive studies of a configuration of an adhesion layer used when an anti-reflective film is attached to cover glass of a display surface in an anti-reflective film laminate in which the anti-reflective film is provided with an attachment function using an adhesive, and thus were able to solve the above problem and completed the present invention.

An object of the present invention is to provide an anti-reflective film laminate that is excellent in preventing scattering of a display surface and in curbing occurrence of sharp edges while improving visibility and a product including the same.

Solution to Problem

In order to solve the above problems, the present invention provides the following means.

According to an aspect of the present invention, there is provided an anti-reflective film laminate including: a first transparent base material that has a first surface and a second surface which is a surface on a back side with respect to the first surface; an anti-reflective layer that includes at least a hard coat layer, an inorganic multilayer film layer, and an antifouling layer provided in order on the first surface; and an adhesion layer provided on the second surface, wherein the adhesion layer consists of two adhesive layers and a second transparent base material sandwiched between the two adhesive layers and directly adhering to each of the two adhesive layers, wherein a reflectance Y is 0.8% or less when light with a wavelength of 380 nm to 780 nm is incident at an incidence angle of 5° from a standard light source D65, wherein a breaking force is 5.7 N or more in a case where a conical probe with a diameter of 8 mm is pressed at a piercing test speed of 500 mm/min, and wherein the first transparent base material is a plastic film.

In the anti-reflective film laminate according to the above aspect, the second transparent base material may be a PET film having a thickness of less than 12 µm.

In the anti-reflective film laminate according to the above aspect, the second transparent base material may be a TAC film.

In the anti-reflective film laminate according to the above aspect, the inorganic multilayer film layer may be a laminate of a low refractive index material layer and a high refractive index material layer, and the low refractive index material layer and the high refractive index material layer may be sputtering films.

In the anti-reflective film laminate according to the above aspect, in an adhesive constituting the adhesive layer, a storage elastic modulus at 25° C. may be 0.20 to 0.10 MPa, and a loss tangent may be 0.40 to 0.20.

The anti-reflective film laminate according to the above aspect may have a thickness of 170 µm or less.

The anti-reflective film laminate according to the above aspect may further include: a protective film on a surface of the antifouling layer on a side opposite to the first transparent base material; and a release film on a surface of an adhesive layer of the two adhesive layers on a side away from the first transparent base material on a side opposite to the second transparent base material.

According to another aspect of the present invention, there is provided a product including the anti-reflective film laminate of the above aspect.

Advantageous Effects of Invention

According to the present invention, it is possible to provide an anti-reflective film laminate that is excellent in preventing scattering on a display surface and in curbing occurrence of sharp edges while improving visibility.

DESCRIPTION OF EMBODIMENTS

Hereinafter, embodiments of the present invention will be described with reference to the drawings. Materials, dimensions, and the like exemplified in the following description are examples, but the present invention is not limited to them and can be implemented with appropriate modifications of them within a scope exhibiting effects of the present invention. A configuration shown in one embodiment can also be applied to another embodiment.

Figure 1:
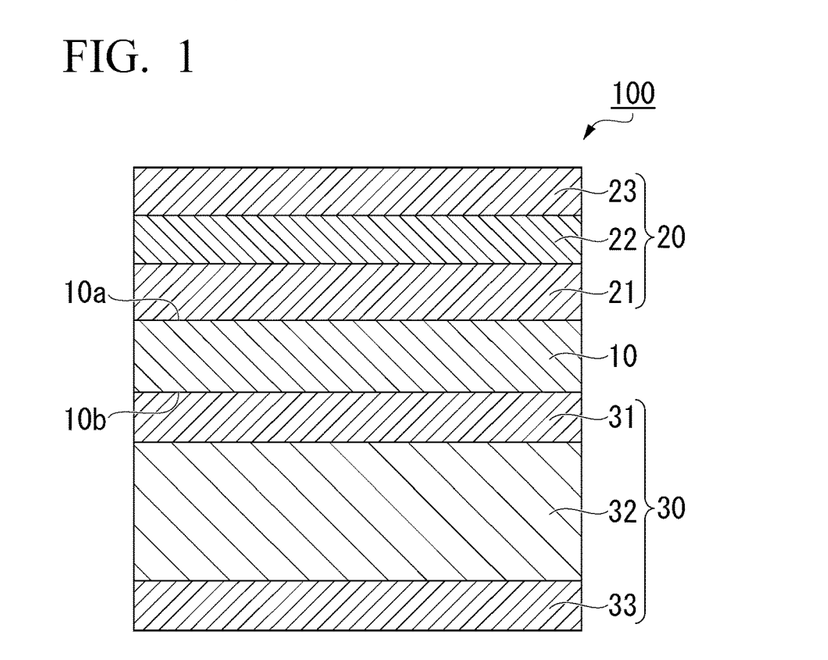
FIG. 1 is a schematic cross-sectional view of an anti-reflective film laminate according to an embodiment of the present invention.

FIG. 1 shows a schematic cross-sectional view of an anti-reflective film laminate according to an embodiment of the present invention.

An anti-reflective film laminate 100 shown in FIG. 1 includes a first transparent base material 10 that has a first surface 10a and a second surface 10b which is a surface on a back side with respect to the first surface 10a, an anti-reflective layer 20 that includes at least a hard coat layer 21, an inorganic multilayer film layer 22, and an antifouling layer 23 provided in order on the first surface 10a, and an adhesion layer 30 provided on the second surface 10b, the adhesion layer 30 contains two adhesive layers 31 and 33 and a second transparent base material 32 sandwiched between the two adhesive layers 31 and 33 and directly adhering to each of the two adhesive layers 31 and 33, a visibility reflectance is 0.8% or less when light with a wavelength of 380 nm to 780 nm is incident at an incidence angle of 5° from a standard light source D65, and a breaking force is 5.7 N or more in a case where a conical probe with a diameter of 8 mm is pressed at a piercing test speed of 500 mm/min.

It is preferable that a thickness of the anti-reflective film laminate 100 be thin because it is often used for attachment to a display or the like. Specifically, it is preferable that the thickness be 170 μm or less, and it is more preferable that the thickness be 140 μm or less.

Figure 2:
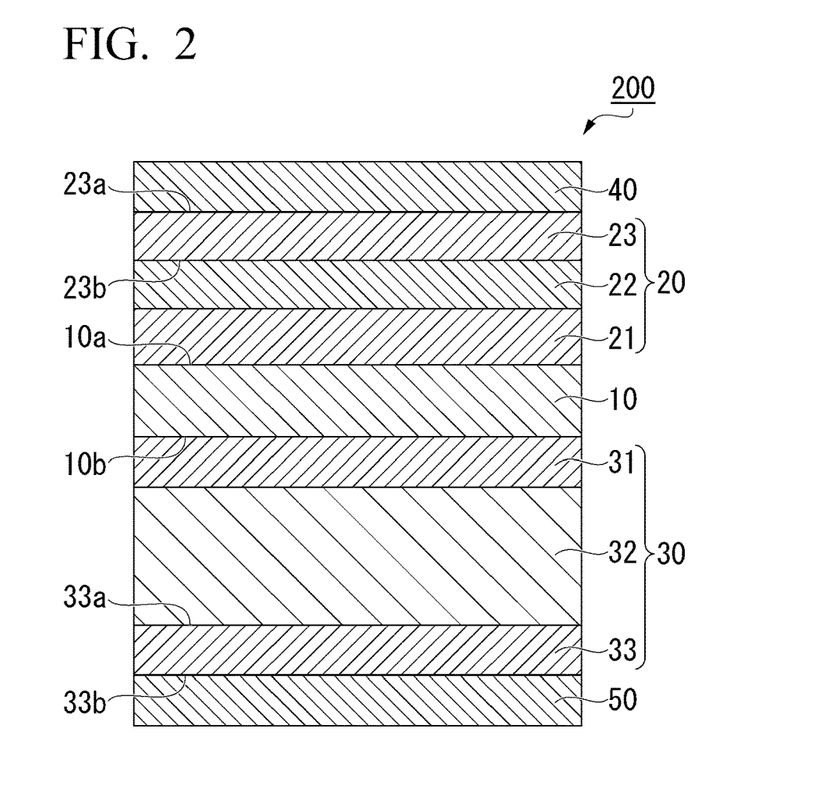
FIG. 2 is a schematic cross-sectional view of an anti-reflective film laminate according to another embodiment of the present invention.

As in an anti-reflective film laminate 200 shown in FIG. 2, from the viewpoint of handling during transportation and storage, a known protective film 40 may be further provided on a surface 23a of the antifouling layer 23 on a side opposite to a surface 23b on a side of the first transparent base material 10. Examples of the protective film 40 include those having a base material such as polypropylene, polyethylene, or polyethylene terephthalate and having an adhesive layer containing natural rubber, synthetic rubber, an acrylic resin, or the like as a main component.

A known release film 50 may be further provided on a surface 33b of an adhesive layer 33 of the two adhesive layers 31 and 33 on a side away from the first transparent base material 10 on a side opposite to a surface 33b on a side of the second transparent base material. Examples of the release film 50 include a film made of polyethylene terephthalate with a surface on which a silicone material or a fluorine-based material is applied.

[First Transparent Base Material]

The first transparent base material 10 has a first surface 10a and a second surface 10b which is a surface on a back side with respect to the first surface 10a.

The first transparent base material 10 only has to be formed from a transparent material that can transmit light in a visible light range, and for example, a plastic film is preferably used as the first transparent base material 10. Specific examples of constituent materials of the plastic film include polyester-based resins, acetate-based resins, polyether sulfone-based resins, polycarbonate-based resins, polyamide-based resins, polyimide-based resins, polyolefin-based resins, (meth)acrylic-based resins, polyvinyl chloride-based resins, polyvinylidene chloride-based resins, polystyrene-based resins, polyvinyl alcohol-based resins, polyarylate-based resins, and polyphenylene sulfide-based resins. In addition, as long as an optical property is not impaired, reinforcing materials such as cellulose nanofibers and nanosilica may be contained in the plastic film. In particular, as the constituent materials of the plastic film, polyester-based resins, acetate-based resins, polycarbonate-based resins, and polyolefin-based resins are preferably used, and specifically, a triacetylcellulose (TAC) base material and a polymethyl methacrylate base material are preferably used. Moreover, a glass film may be used as an inorganic base material.

In a case where the plastic film is formed of a TAC base material, when the hard coat layer 21 is formed on one side of the film, it is possible to form a permeation layer obtained by the permeation of a part of a component constituting the hard coat layer 21, and it is possible to curb the occurrence of interference fringes due to adhesion between the transparent base material and the coat layer 21 and a difference in a refractive index between the layers.

Also, the first transparent base material 10 may be a film provided with an optical function or a physical function. Examples of the film having an optical or physical function include a polarizing plate, a phase difference compensation film, a heat ray blocking film, a transparent conductive film, a brightness enhancement film, and the like.

Although a thickness of the first transparent base material 10 is not particularly limited, it is preferable that the thickness be 25 μm or more, for example. It is more preferable that the thickness be 40 μm or more.

If the thickness of the first transparent base material 10 is less than 25 μm, wrinkles are likely to occur when stress is applied, and thus it may be difficult to perform the operation for continuously forming the hard coat layer 21 on the first transparent base material 10 when the anti-reflective film laminate 100 is manufactured. In addition, there is a concern that curling will increase and scratch hardness will also deteriorate.

In a case where the first transparent base material 10 is formed in a roll during the manufacture, if the thickness of the first transparent base material 10 exceeds 300 μm, the first transparent base material 10 cannot be formed into a roll shape when the anti-reflective film laminate 100 is manufactured, or it may be disadvantageous in reducing the thickness, weight, and cost of the anti-reflective film laminate 100. In addition, when the hard coat layer 21 is laminated, gases (moisture, organic matter, and the like) are likely to be generated from the first transparent base material 10, which may hinder the formation of the hard coat layer 21.

The surface of the first transparent base material 10 may be subjected in advance to etching treatment or undercoating treatment such as sputtering, corona discharge, ultraviolet irradiation, electron beam irradiation, chemical conversion, or oxidation. By performing these treatments in advance, it is possible to improve the adhesion with the hard coat layer 21 formed on the first transparent base material 10. Further, before the hard coat layer 21 is formed, it is also preferable to remove dust from and to clean the surface of the first transparent base material 10 by performing solution cleaning, ultrasonic cleaning, or the like, if necessary.

[Anti-Reflective Layer]

The anti-reflective layer 20 is provided on the first surface 10a of the first transparent base material 10 and includes the hard coat layer 21, the inorganic multilayer film layer 22, and the antifouling layer 23 in order from a side of the first surface 10a.

<Hard Coat Layer>

The hard coat layer 21 is a cured layer of organic substances or a cured layer of organic substances containing inorganic substances formed between the first transparent base material 10 and the inorganic multilayer film layer 22.

The hard coat layer 21 may contain silica (Si oxide) particles or alumina (aluminum oxide) particles as a filler in a binder resin. These silica particles or alumina particles may be exposed from a surface of the hard coat layer 21 on a side of the inorganic multilayer film layer 22. According to such a configuration, the inorganic multilayer film layer 22 can be strongly bonded to the binder resin of the hard coat layer 21 and more firmly adheres to the exposed silica particles or alumina particles, and thus the adhesion between the hard coat layer 21 and the inorganic multilayer film layer 22 can be improved, and scratch resistance of the anti-reflective film laminate 100 can be improved.

Further, the silica particles or alumina particles, which are a filler for the hard coat layer 21, have an average particle size of, for example, 800 nm or less, preferably 780 nm or less, and more preferably 100 nm or less and are preferably dispersed in the binder resin of the hard coat layer 21 in a state of single particles. When the silica particles or alumina particles are dispersed as such a filler, it is possible to form fine unevenness in the surface of the hard coat layer 21, it is possible to increase the hardness of the hard coat layer 21, and it is possible to improve the adhesion with anti-reflective film laminate 100.

As the binder resin of the hard coat layer 21, a transparent resin is preferable, and for example, an ionizing radiation-curable resin which is cured with ultraviolet rays or electron beams, a thermoplastic resin, a thermosetting resin, or the like can be used.

Examples of the ionizing radiation-curable resin used as the binder resin of the hard coat layer 21 include ethyl (meth)acrylate, ethylhexyl (meth)acrylate, styrene, methylstyrene, N-vinylpyrrolidone, and the like.

Examples of a compound that is the ionizing radiation-curable resin having two or more unsaturated bonds include a polyfunctional compound and the like such as trimethylolpropane tri(meth)acrylate, tripropylene glycol di(meth)acrylate, diethylene glycol di(meth)acrylate, dipropylene glycol di(meth)acrylate, pentaerythritol tri(meth)acrylate, pentaerythritol tetra(meth)acrylate, dipentaerythritol hexa(meth)acrylate, 1,6-hexanediol di(meth)acrylate, neopentyl glycol di(meth)acrylate, trimethylolpropane tri(meth)acrylate, ditrimethylolpropane tetra(meth)acrylate, dipentaerythritol penta(meth)acrylate, tripentaerythritol octa(meth)acrylate, tetrapentaerythritol deca(meth)acrylate, isocyanuric acid tri(meth)acrylate, isocyanuric acid di(meth)acrylate, polyester tri(meth)acrylate, polyester di(meth)acrylate, bisphenol di(meth)acrylate, diglycerin tetra(meth)acrylate, adamantyl di(meth)acrylate, isobornyl di(meth)acrylate, dicyclopentane di(meth)acrylate, tricyclodecane di(meth) acrylate, and ditrimethylolpropane tetra(meth)acrylate. Among them, pentaerythritol triacrylate (PETA), dipentaerythritol hexaacrylate (DPHA), and pentaerythritol tetraacrylate (PETTA) are preferably used. In addition, "(meth)acrylate" refers to methacrylate and acrylate. As the ionizing radiation-curable resin, the above-mentioned compounds modified with propylene oxide (PO), ethylene oxide (EO), caprolactone (CL), or the like can also be used.

Examples of the thermoplastic resin used as the binder resin of the hard coat layer 21 include styrene-based resins, (meth)acrylic-based resins, vinyl acetate-based resins, vinyl ether-based resins, halogen-containing resins, alicyclic olefin-based resins, polycarbonate-based resins, polyester-based resins, polyamide-based resins, cellulose derivatives, silicone-based resins, rubber, elastomer, and the like. The thermoplastic resin is preferably amorphous and soluble in an organic solvent (in particular, a common solvent capable of dissolving a plurality of polymers or curable compounds). In particular, from the viewpoint of transparency and weather resistance, styrene-based resins, (meth)acrylic-based resins, alicyclic olefin-based resins, polyester-based resins, cellulose derivatives (cellulose esters and the like), and the like are preferable.

Examples of the thermosetting resin used as the binder resin of the hard coat layer 21 include a phenol resin, a urea resin, a diallyl phthalate resin, a melamine resin, a guanamine resin, an unsaturated polyester resin, a polyurethane resin, an epoxy resin, an aminoalkyd resin, a melamine-urea co-condensation resin, a silicon resin, a polysiloxane resin (including so-called silsesquioxane and the like in the form of cages, ladders, or the like), and the like.

The hard coat layer 21 may contain an organic resin and an inorganic material, or may be an organic-inorganic hybrid material. As an example, a material formed by a sol-gel method is exemplified. As the inorganic material, silica, alumina, zirconia, and titania are exemplified. As the organic material, an acrylic resin is exemplified.

Although a thickness of the hard coat layer 21 is not particularly limited, it is preferable that the thickness be 0.5 μm or more, for example. It is more preferable that the thickness be 1 μm or more. The upper limit of the thickness is 100 μm or less.

If the thickness of the hard coat layer 21 is less than 0.5 μm, there is a concern that the strength will be insufficient and the scratch hardness will deteriorate. On the other hand, if the thickness of the hard coat layer 21 is too thick, it may be disadvantageous in reducing the thickness, weight, and cost of the anti-reflective layer 10.

The hard coat layer 21 may be a single layer or a plurality of layers. Further, the hard coat layer 21 may be further provided with known functions such as ultraviolet absorption performance, antistatic performance, a refractive index adjustment function, and a hardness adjustment function.

Moreover, the function provided to the hard coat layer 21 may be provided to a single hard coat layer 21 or may be provided to be divided into a plurality of layers.

<Inorganic Multilayer Film Layer>

The inorganic multilayer film layer 22 is a laminate that exhibits an optical function, which is an anti-reflective function in the present embodiment. In the inorganic multilayer film layer 22 of the present embodiment, a low refractive index layer a and a high refractive index layer b are alternately laminated in order from a side of the hard coat layer 21. For example, the inorganic multilayer film layer 22 may be a laminate of a total of five layers in which both of a side of the hard coat layer 21 and a side of the antifouling layer 23 are the low refractive index layers a.

Among them, the low refractive index layer a in contact with the hard coat layer 21 functions as an adhering layer for the hard coat layer 21.

The number of layers of the low refractive index layer a and the high refractive index layer b is not limited to five layers, and the low refractive index layer a and the high refractive index layer b of any number of layers can be formed.

The low refractive index layer a is a layer having $SiO_2$ (an oxide of Si) or the like as a main component. A $SiO_2$ single layer film is colorless and transparent, and the refractive index of the low refractive index layer is preferably 1.20 to 1.60, more preferably 0 to 1.50.

An inorganic thin film layer containing the oxide of Si may contain up to 50% of another element.

Na may be contained for the purpose of improving durability, and Zr, Al, and N may be contained for the purpose of improving hardness. The content of the other element is preferably 10% or less.

The refractive index of the high refractive index layer is preferably 2.00 to 2.60, more preferably 2.10 to 2.45. Examples of a dielectric with such a high refractive index include niobium pentoxide ($Nb_2O_5$, a refractive index 2.33), titanium oxide ($TiO_2$, a refractive index 2.33 to 2.55), tungsten oxide ($WO_3$, a refractive index 2.2), cerium oxide ($CeO_2$, a refractive index 2.2), tantalum pentoxide ($Ta_2O_5$, a refractive index 2.16), zinc oxide (ZnO, a refractive index 2.1), indium tin oxide (ITO, a refractive index 2.06), and the like.

When the low refractive index layer a and the high refractive index layer b are alternately laminated, the light incident from a side of the antifouling layer 23 is diffused to be prevented from being reflected in one direction, and thus it is possible to exhibit the anti-reflective function.

The inorganic multilayer film layer 22 can be formed by sputtering the low refractive index layer a and the high refractive index layer b. At this time, the sputtering target only has to be changed between when forming the low refractive index layer a and when forming the high refractive index layer b. Further, for example, when one type of material is used as a target and an oxygen flow rate during sputtering is changed, a layer made of the target material and a layer made of the oxide of the target material may be alternately formed as the low refractive index layer and the high refractive index layer.

A film thickness of the low refractive index layer a constituting the inorganic multilayer film layer 22 is appropriately selected according to a wavelength range requiring the anti-reflective function and only has to be, for example, 1 nm or more and 200 nm or less. Moreover, a film thickness of the high refractive index layer b only has to be in the range of 15 nm or more and 200 nm or less.

The film thicknesses of all of the low refractive index layers a and the high refractive index layers b do not need to be the same film thickness and can be appropriately selected according to the design of the inorganic multilayer film layer 22. For example, in order from a side of the hard coat layer 21, a low refractive index layer a having a film thickness of 30 to 120 nm, a high refractive index layer b having a film thickness of 10 to 50 nm, a low refractive index layer a having a film thickness of 30 to 120 nm, a high refractive index layer b having a film thickness of 50 to 200 nm, a low refractive index layer a having a film thickness of 50 to 200 nm, and the like can be laminated.

<Antifouling Layer>

The antifouling layer 23 is formed on the outermost surface of the inorganic multilayer film layer 22 to prevent the inorganic multilayer film layer 22 from being fouled and to curb the inorganic multilayer film layer 22 from being worn due to its abrasion resistance when applied to a touch panel or the like.

As the fluorine-based organic compounds forming the antifouling layer 23, a compound including a fluorine-modified organic group and a reactive silyl group (for example, alkoxysilane) is preferably used. One example of the compound is perfluorodecyltriethoxysilane (FDTS). Examples of a commercially available product of the compound include OPTOOL DSX (manufactured by Daikin Co., Ltd.), KY-1901 (manufactured by Shin-Etsu Chemical Co., Ltd.), and the like.

The antifouling layer 23 may further contain additives such as a light stabilizer, an ultraviolet absorber, a coloring agent, an antistatic agent, a lubricant, a leveling agent, an antifoaming agent, an antioxidant, a flame retardant, an infrared absorber, and a surfactant, if necessary.

The antifouling layer 23 may formed by diluting the above-mentioned fluorine compound with a soluble solvent, applying the diluted compound on the inorganic multilayer film layer 22 using a known applying device such as a bar coater, and then drying the compound, or may be formed by a vapor deposition method or the like.

[Adhesion Layer]

The adhesion layer 30 is provided on the second surface 10b of the first transparent base material 10 and includes the second transparent base material 32 and the two adhesive layers 31 and 33 provided on both surfaces of the second transparent base material 32. The entire surface of the second transparent base material 32 is directly adhered to each of the two adhesive layers 31 and 33.

<Second Transparent Base Material>

The second transparent base material 32 only has to be formed from a transparent material that can transmit light in a visible light range, and for example, a plastic film is preferably used as the second transparent base material 32. Specific examples of constituent materials of the plastic film include polyester-based resins, acetate-based resins, polyether sulfone-based resins, polycarbonate-based resins, polyamide-based resins, polyimide-based resins, polyolefin-based resins, (meth)acrylic-based resins, polyvinyl chloride-based resins, polyvinylidene chloride-based resins, polystyrene-based resins, polyvinyl alcohol-based resins, polyarylate-based resins, polyphenylene sulfide-based resins, and the like. In particular, as the constituent materials of the plastic film, polyester-based resins, acetate-based resins, polycarbonate-based resins, and polyolefin-based resins are preferably used, and specifically, a triacetylcellulose (TAC) base material, a polyethylene terephthalate base material, and a polymethyl methacrylate resin are preferably used.

A tensile elastic modulus of the material of the second transparent base material 32 is preferably 490 to 4500 MPa.

The refractive index of the second transparent base material 32 preferably has a small difference from the refractive index of the first transparent base material 10 in order not to impair the optical property of the anti-reflective film laminate, and for example, it is possible to make the difference be 0.1 or less.

<Adhesive Layer>

In the adhesive layers 31 and 33 of the present embodiment, as an adhesive, various pressure-sensitive adhesives such as rubber-based adhesives, acrylic-based adhesives, and silicone-based adhesives can be used. The acrylic-based adhesives are preferable from the viewpoints of enabling the adhesive to be colorless and transparent, reducing the loss of the optical property of the anti-reflective film laminate, facilitating adjustment of adhesiveness, and selecting materials.

The refractive index difference between the adhesive layers 31 and 33 and the second transparent base material 32 is preferably as small as possible from the viewpoint of not impairing the optical property of the anti-reflective film laminate, for example, it is possible to make the difference be 0.12 or less, and furthermore, it is possible to make the difference be 0.05 or less.

Moreover, the adhesive layers 31 and 33 formed on both surfaces of the second transparent base material 32 may be made of the same composition or different compositions from the viewpoint of a desired optical property or impact resistance. However, from the viewpoint of the optical property, it is preferable that the refractive index difference between both surfaces be small.

In the adhesive layers 31 and 33, from the viewpoint of impact resistance, it is desirable that a storage elastic modulus at 25° C. be 0.20 to 0.10 MPa and a loss tangent be 0.40 to 0.20.

The method of manufacturing the adhesion layer 30 is not particularly limited and includes a method of applying a solution-diluted adhesive composition on the second transparent base material 32 and drying the composition, a method of applying a solution-free ultraviolet curable composition on the second transparent base material 32 and emitting ultraviolet to cure the ultraviolet curable composition in a case where an adhesive composition is the solution-free ultraviolet curable composition, a method of transferring an adhesive layer on the second transparent base material 32 from a release sheet provided with the adhesive layers 31 and 33, and the like, and these methods may be combined. A thickness of the adhesion layer is not particularly limited, and it is preferably about 5 to 30 μm.

[Method of Manufacturing Anti-Reflective Film Laminate]

An example of a method of manufacturing an anti-reflective film laminate is a method in which the anti-reflective layer is formed on the first surface of the first transparent base material, and then the adhesion layer manufactured by the method described above is bonded to the anti-reflective layer using one adhesive layer. Alternatively, the anti-reflective layer may be formed on the first surface after the adhesion layer is bonded to the second surface of the first transparent base material in advance.

Further, there is a method in which one of the adhesive layers is formed on the second surface of the first transparent base material in advance and then the release film is bonded to the one of the adhesive layers for protection, the anti-reflective layer is formed on the first surface of the first transparent base material and then the release film is peeled off, and a separately manufactured second transparent base material having an adhesive layer provided only on one side thereof is bonded to the one of the adhesive layers.

[Product]

The product according to the present embodiment is, for example, a liquid crystal display panel, an organic EL display panel, or the like, in which the anti-reflective film laminate described above is provided on a display surface of an image display portion. As a result, it is possible to provide an effect of reducing injury that occur when a passenger collides with a liquid crystal display panel or an organic EL display panel, especially a liquid crystal display panel or an organic EL display panel installed inside or outside a transportation machine such as an automobile with a strong force in the event of an accident or the like, for example.

In addition, the product is not limited to an image display device, and examples of the product include a window glass or a goggle, a light receiving surface of a solar cell, a screen of a smartphone or a display of a personal computer, an information input terminal, a tablet terminal, an electronic display board, a glass table surface, a game machine, an operation support device for aircraft, a train, or the like, a navigation system, an instrument panel, an optical sensor surface, a helmet visor, a mirror, a head-mounted display, and the like on which the anti-reflective film laminate of the present embodiment is provided on a surface.

EXAMPLES

Example 1

A TAC film having a thickness of 80 μm was used as a first transparent base material, and a photocurable resin composition shown in Table 1 below was applied to a first surface of the TAC film using a bar coater. Then, the resin composition was photopolymerized and dried, and a hard coat layer having a thickness of 5 μm was formed.

TABLE 1

|  | Product name | Manufacturer | Structure | Mix proportion |
|---|---|---|---|---|
| Acrylate | CN968 | Sartomer | Hexafunctional aliphatic urethane acrylate having polyester skeleton | 8% |
|  | SR444 | Sartomer | Pentaerythritol triacrylate | 7% |
|  | SR610 | Sartomer | Polyethylene glycol (600) diacrylate (polyethylene glycol chain molecular weight: about 600) | 11% |
| Silica fine particle | IPA-ST-L | Nissan Chemical Corporation | Silica sol (particle size 40 to 50 nm, solvent IPA, solid component 30%) | 37% |
| Ultraviolet curing initiator | Irgacure 184 | BASF | Hydroxy-cyclohexyl-phenyl-ketone | 2% |
| Solution | PGMA |  | Propylene glycol monomethyl ether acetate | 30% |
|  | Butyl acetate |  |  | 5% |
| Total |  |  |  | 100% |
| Levelling agent | BYK377 | BYK | Polyether modified polydimethylsiloxane containing Hydroxyl group | 0.01 parts by weight per above total 100 parts by weight |

Next, the hard coat layer was surface-treated at a glow discharge treatment rate of 8300 W·min/m².

After the glow treatment, an adhesion layer (a low refractive index layer) which has a thickness of 10 nm and which is made of SiOx was formed by sputtering, and an AR layer (an inorganic multilayer film layer) which has a thickness of 200 nm and which constituted by an $Nb_2O_5$ film (a high refractive index layer), an $SiO_2$ layer (a low refractive index layer), an $Nb_2O_5$ film (a high refractive index layer), and a $SiO_2$ layer (a low refractive index layer) was formed on the adhesion layer. Furthermore, an antifouling layer which has a thickness of 10 nm and which is made of an alkoxysilane compound having a perfluoropolyether group was formed on the AR layer to obtain an anti-reflective layer.

On the other hand, a TAC film (refractive index: 1.49) having a thickness of 25 μm was used as a second transparent base material, and an acrylic-based adhesive having a refractive index of 1.47 was applied on both sides of the film with a bar coater to have a thickness of 10 μm, as a result, an adhesive layer was formed to obtain an adhesion layer.

After that, a first surface of the adhesive layer in the adhesion layer was bonded to a second surface of the first transparent base material to obtain an anti-reflective film laminate having the adhesion layer.

Example 2

An anti-reflective film laminate was obtained in the same manner as in Example 1, except that a transparent PET film (refractive index: 1.58) having a thickness of 6 μm was used as the second transparent base material.

Example 3

An anti-reflective film laminate was obtained in the same manner as in Example 1, except that a transparent PET film (refractive index: 1.58) having a thickness of 9 μm was used as the second transparent base material.

Comparative Example 1

An acrylic-based adhesive was applied on a release-treated PET film having a thickness of 75 μm such that a thickness of the acrylic-based adhesive was 25 μm to form an adhesion layer having no second transparent base material. After that, this adhesive layer was bonded to the anti-reflective layer obtained in the same manner as in Example 1 to obtain an anti-reflective film laminate having an adhesion layer having no second transparent base material.

Comparative Example 2

An anti-reflective film laminate was obtained in the same manner as in Example 1, except that a transparent PET film (refractive index: 1.58) having a thickness of 16 μm was used as the second transparent base material.

Comparative Example 3

An anti-reflective film laminate was obtained in the same manner as in Example 1, except that a transparent PET film (refractive index: 1.58) having a thickness of 25 μm was used as the second transparent base material.

[Evaluation]

The anti-reflective film laminates of the above examples and comparative examples were evaluated for the scattering curbing effect and the optical property of the glass panel by the methods which will be described below.

[Piercing Test]

Figure 3A:
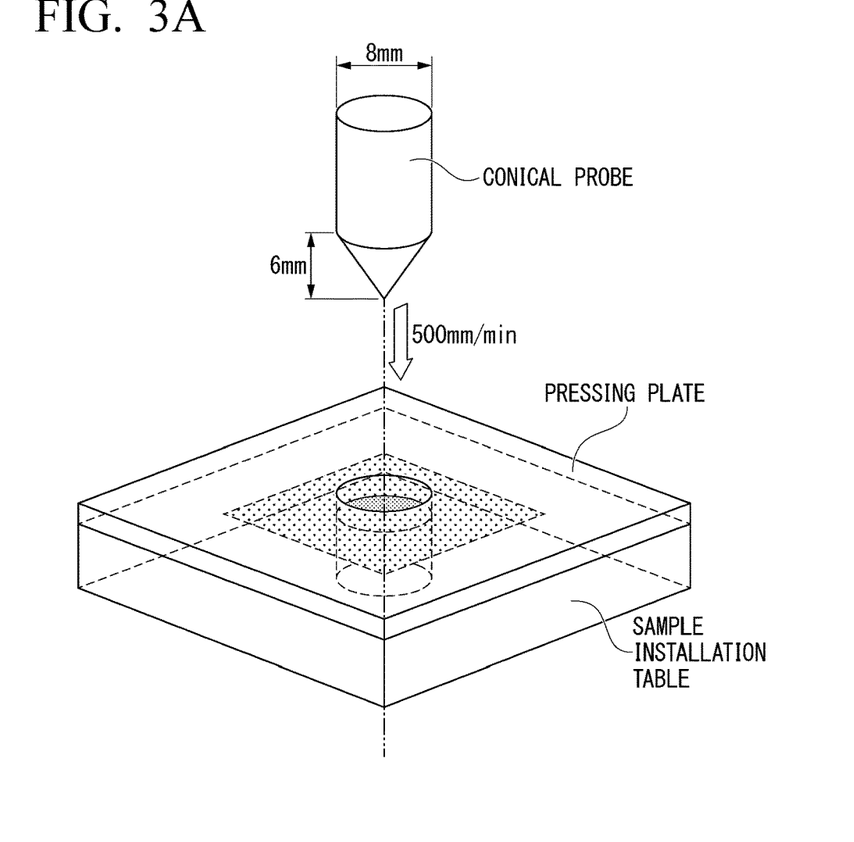
FIG. 3A is a perspective view showing an outline of a piercing test.
Figure 3B:
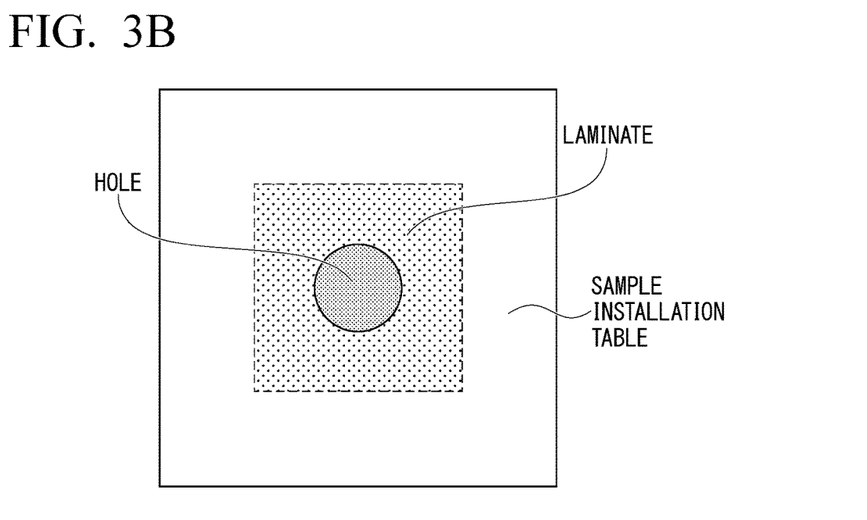
FIG. 3B is a schematic plan view showing a state in which an anti-reflective film laminate sample used in the piercing test is attached to a sample installation table.
Figure 4:
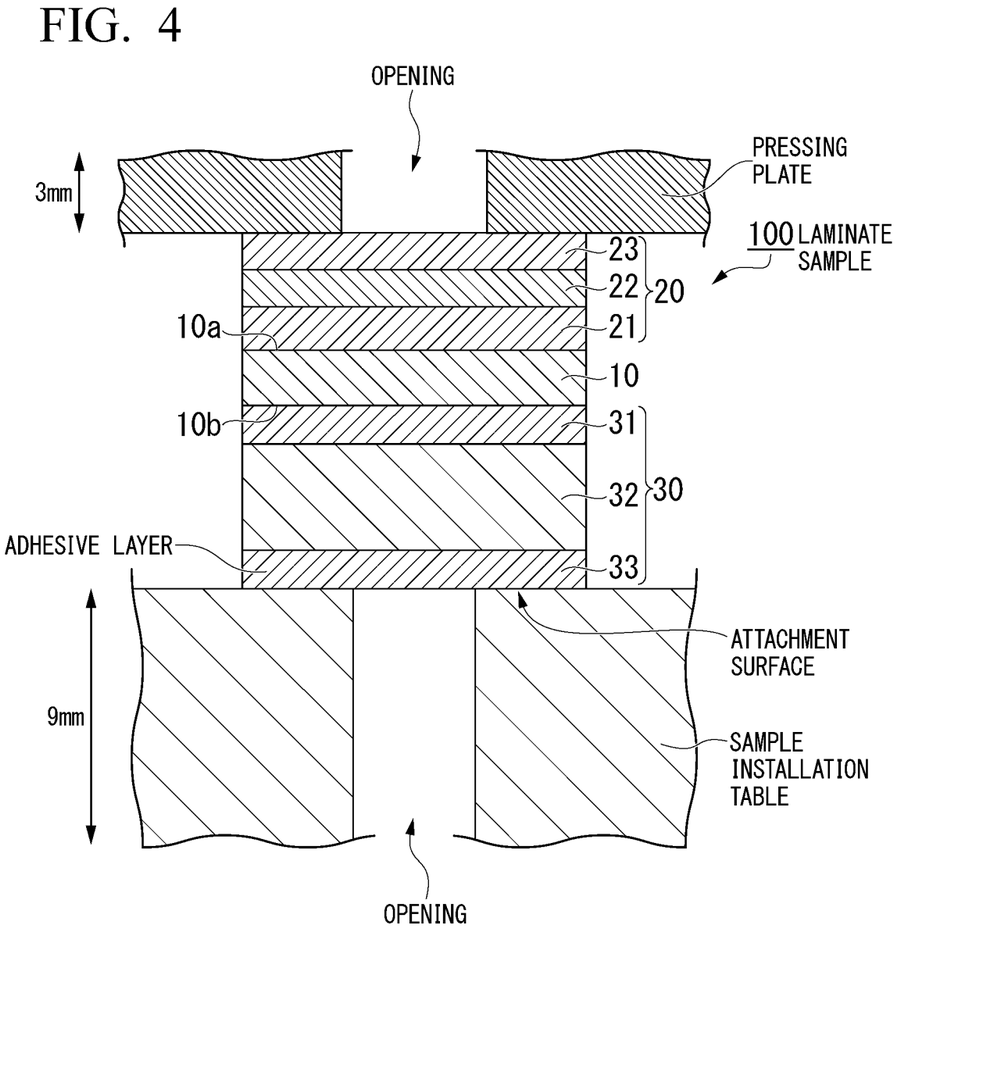
FIG. 4 is a schematic cross-sectional view in which a part of the anti-reflective film laminate sample is enlarged in a state where the anti-reflective film laminate sample is sandwiched between the sample installation table and a pressing plate as shown in FIG. 3A.

In this specification, a piercing test means that an anti-reflective film laminate sample is attached to an opening of a sample installation table (thickness: 9 mm) provided with the circular opening having a height of 9 mm and a diameter of 9 mm using an adhesive layer (see FIG. 3B), a pressing plate (thickness: 3 mm) having a circular opening with a height of 3 mm and a diameter of 11 mm is pressed and fixed on the sample installation table such that the openings overlap each other (see FIG. 4), a predetermined piercing jig (a probe) is pushed into a portion of the anti-reflective film laminate sample which overlaps the openings at a constant piercing speed (see FIG. 3A), and a force (a breaking force) applied when the anti-reflective film laminate sample breaks (ruptures) is measured.

Samples for the piercing test were prepared by cutting the anti-reflective film laminate of the above-described examples and comparative examples into 30 mm squares.

As the piercing jig, a piercing jig (a conical probe) which is made of stainless steel, which has a diameter of 8 mm, and of which a tip end side has a conical shape was used. A length of the conical portion is 6 mm and the tip end of the conical portion is pointed.

The above-mentioned sample installation table was set in a tester (EZ-SX, manufactured by Shimadzu Corporation) with the pressing plate facing upward, the piercing jig was pressed to the anti-reflective film laminate sample at a piercing speed of 500 mm/min, and a force (a breaking force) at which the anti-reflective film laminate sample breaks was measured.

In the anti-reflective film laminate of the present invention, the breaking force is required to be 5.7 N or more.

[Falling Ball Test]

In this specification, a falling ball test means that the anti-reflective film laminates of the above-described examples and comparative examples are bonded to a cover glass of an 8-inch LCD module with a cover glass to prepare a test sample, a 6.8 kg iron ball is dropped to the test sample with the bonding surface upward from a height of 2.4 m, and a scattering prevention effect of the broken cover glass and a sharp edge prevention effect of the broken cover glass are evaluated. The above LCD module with a cover glass is an LCD module provided with a chemically strengthened soda lime glass having a thickness of 1.1 mm as a cover glass.

<Evaluation of Scattering Prevention Property>

After the falling ball test, the presence or absence of scattering of the broken cover glass of the LCD module was visually checked.

<Sharp Edge Evaluation>

After the falling ball test, it was checked whether or not the broken cover glass of the LCD module had broken through the anti-reflective film laminate.

[Optical Property Evaluation]

In addition, a reflectance Y (%), a total light transmittance (%), and iridescent unevenness of the anti-reflective film laminate were measured by the following methods.

<Reflectance Y (%)>

The reflectance Y means a visibility-corrected reflectance (visibility is color sensation of the human eye, that is, sensitivity of the color-sensing cells of the retina) and specifically, is obtained by visibility-correcting a spectral reflectance of 380 nm to 780 nm for a C light source defined in JIS Z8701 using a color matching function Y(λ) defined by CIE. The reflected light Y can be measured using a spectrophotometer or the like.

Measurement was performed using a spectrophotometer U-4100 (manufactured by Hitachi High-Tech Science Co., Ltd.) under conditions of an incidence angle of 5° and a standard light source of D65.

In the anti-reflective film laminate of the present invention, the reflectance Y is required to be 0.8% or less.

<Total Light Transmittance (%)>

The total light transmittance refers to all the light transmitted when light equivalent to the standard light source D65 is incident on a measurement object and refers to a value measured using a haze meter manufactured in accordance with a method specified in JIS K7361.

The total light transmittance was measured using a haze meter NDH-5000 (manufactured by Nippon Denshoku Industries Co., Ltd.).

In the anti-reflective film laminate of the present invention, the total light transmittance is preferably 94% or more.

<Iridescent Unevenness>

The iridescent unevenness refers to iridescent interference unevenness that occurs when light is reflected at each interface and the reflected light rays interfere with each other.

For the iridescent unevenness, the anti-reflective film laminate and the soda lime glass bonded to each other were rotated while being superimposed on the liquid crystal display displaying white, and the presence or absence of a change in color tone was checked.

<Refractive Index Difference Between Second Transparent Base Material and Adhesive Layer>

In the anti-reflective film laminate of the present invention, the refractive index difference between the second transparent base material and the adhesive layer is preferably 0.12 or less.

Various test results are shown in Table 2 below.

piercing test is low, the occurrence of the sharp edges cannot be curbed, and passenger protection performance in the event of an accident is poor.

In the anti-reflective film laminates according to the comparative Examples 2 and 3, the breaking force in the piercing test is high, but the reflectance is high and the anti-reflective function is poor. Especially, in a case where the anti-reflective film laminate is combined with the display provided in the transportation machine such as an automobile, it is not suitable.

REFERENCE SIGNS LIST

10 First transparent base material
10a First surface
10b Second surface
20 Anti-reflective layer
21 Hard coat layer
22 Inorganic multilayer film layer
23 Antifouling layer
30 Adhesion layer
31, 33 Adhesive layer
32 Second transparent base material

What is claimed is:

1. An anti-reflective film laminate comprising:
a first transparent base material that has a first surface and a second surface which is a surface on a back side with respect to the first surface;

TABLE 2

| Layer configuration | | | | Example 1 | Example 2 | Example 3 | Comparative example 1 | Comparative example 2 | Comparative example 3 |
|---|---|---|---|---|---|---|---|---|---|
| | Antifouling layer | | Thickness (μm) | 0.01 | 0.01 | 0.01 | 0.01 | 0.01 | 0.01 |
| | AR layer | | Thickness (μm) | 0.2 | 0.2 | 0.2 | 0.2 | 0.2 | 0.2 |
| | Hard coat layer | | Thickness (μm) | 5 | 5 | 5 | 5 | 5 | 5 |
| | First transparent base material | | Material | TAC | TAC | TAC | TAC | TAC | TAC |
| | | | Thickness (μm) | 80 | 80 | 80 | 80 | 80 | 80 |
| | Adhesion layer | Adhesive layer | Thickness (μm) | 10 | 10 | 10 | 10 | 25 | 10 |
| | | | Refractive index | 1.47 | 1.47 | 1.47 | 1.47 | 1.47 | 1.47 |
| | | Second transparent base material | Material | TAC | PET | PET | | PET | PET |
| | | | Thickness (μm) | 25 | 6 | 9 | | 16 | 25 |
| | | | Refractive index | 1.49 | 1.58 | 1.58 | | 1.58 | 1.58 |
| | | Adhesive layer | Thickness (μm) | 10 | 10 | 10 | | 10 | 10 |
| | | | Refractive index | 1.47 | 1.47 | 1.47 | | 1.47 | 1.47 |
| Refractive index difference Δ between second transparent base material and adhesive layer | | | | 0.02 | 0.11 | 0.11 | — | 0.11 | 0.11 |
| Reflectance Y (%) | | | | 0.24 | 0.72 | 0.78 | 0.18 | 0.84 | 0.93 |
| Total light transmittance (%) | | | | 95.6 | 94.4 | 94.5 | 96.4 | 94.6 | 94.5 |
| Piercing test breaking force (N) | | | | 6.92 | 5.79 | 5.96 | 5.52 | 6.34 | 6.83 |
| Iridescent unevenness | | | | Absence | Absence | Absence | Absence | Presence | Presence |
| Scattering prevention property (presence or absence of scattering of glass) | | | | Presence | Presence | Presence | Presence | Presence | Presence |
| Falling ball test (presence or absence of sharp edge) | | | | Absence | Absence | Absence | Presence | — | — |

In the anti-reflective film laminates according to the examples, the reflectance is lower than a predetermined value, and thus, especially in a case where the anti-reflective film laminate is combined with a display provided in a transportation machine such as an automobile, the occurrence of the sharp edge is curbed while the anti-reflective film laminate has suitable anti-reflective performance. Therefore, for example, when the head of the passenger hits the display due to impact in the event of an accident or the like, even if the glass that makes up the display is broken, it can be expected to reduce injury to the passenger.

In the anti-reflective laminate according to the comparative example 1, it is supposed that the reflectance satisfies predetermined performance, but the breaking force in the an anti-reflective layer that comprises: a hard coat layer; an inorganic multilayer film layer; and an antifouling layer provided in order on the first surface; and
an adhesion layer provided on the second surface,
wherein the adhesion layer consists of two adhesive layers and a second transparent base material sandwiched between the two adhesive layers and directly adhering to each of the two adhesive layers,
wherein a reflectance Y of the anti-reflective film laminate is 0.8% or less when light with a wavelength of 380 nm to 780 nm is incident at an incidence angle of 5° from a standard light source D65,
wherein a breaking force of the anti-reflective film laminate is 5.7 N or more in a case where a conical probe with a diameter of 8 mm is pressed at a piercing test speed of 500 mm/min, wherein the first transparent base material is a triacetylcellulose film having a thickness of 80 µm or less,
wherein the hard coat layer contacts the first surface,
wherein the hard coat layer is a single layer having a thickness of 0.5 to 5 µm,
wherein the adhesion layer contacts the second surface,
wherein the inorganic multilayer film layer is a laminate of a low refractive index material layer and a high refractive index material layer, and each of the low refractive index material layer and the high refractive index material layer is a sputtering film,
wherein the second transparent base material is a polyethylene terephthalate film having a thickness of 9 µm or less,
wherein each of the two adhesive layers is provided on each surface of the second transparent base material,
wherein each difference of refractive index between each of the two adhesive layers and the second transparent base material is 0.12 or less, and
wherein a thickness of the anti-reflective film laminate is 170 µm or less.

2. The anti-reflective film laminate according to claim 1, wherein, an adhesive constituting the adhesive layer has a storage elastic modulus at 25° C. of from 0.20 to 0.10 MPa, and a loss tangent of from 0.40 to 0.20.

3. The anti-reflective film laminate according to claim 1, further comprising:
a protective film on a surface of the antifouling layer on a side opposite to the first transparent base material; and
a release film on a surface of an adhesive layer of the two adhesive layers on a side away from the first transparent base material on a side opposite to the second transparent base material.

4. A product comprising the anti-reflective film laminate according to claim 1.

5. The anti-reflective film laminate according to claim 1, wherein the first transparent base material is a single layer which is optionally surface-treated, and the second transparent base material is a single layer.

6. An anti-reflective film laminate comprising:
a first transparent base material that has a first surface and a second surface which is a surface on a back side with respect to the first surface;
an anti-reflective layer that comprises: a hard coat layer; an inorganic multilayer film layer; and an antifouling layer provided in order on the first surface; and
an adhesion layer provided on the second surface,
wherein the adhesion layer consists of two adhesive layers and a second transparent base material sandwiched between the two adhesive layers and directly adhering to each of the two adhesive layers,
wherein a reflectance Y of the anti-reflective film laminate is 0.8% or less when light with a wavelength of 380 nm to 780 nm is incident at an incidence angle of 5° from a standard light source D65,
wherein a breaking force of the anti-reflective film laminate is 5.7 N or more in a case where a conical probe with a diameter of 8 mm is pressed at a piercing test speed of 500 mm/min,
wherein the first transparent base material is a triacetylcellulose film having a thickness of 80 µm or less,
wherein the hard coat layer contacts the first surface,
wherein the hard coat layer is a single layer having a thickness of 0.5 to 5 µm,
wherein the adhesion layer contacts the second surface,
wherein the inorganic multilayer film layer is a laminate of a low refractive index material layer and a high refractive index material layer, and each of the low refractive index material layer and the high refractive index material layer is a sputtering film,
wherein the second transparent base material is a triacetylcellulose film,
wherein each of the two adhesive layers is provided on each surface of the second transparent base material,
wherein each difference of refractive index between each of the two adhesive layers and the second transparent base material is 0.12 or less, and
wherein a thickness of the anti-reflective film laminate is 170 µm or less.

7. The anti-reflective film laminate according to claim 6, wherein, an adhesive constituting the adhesive layer has a storage elastic modulus at 25° C. of from 0.20 to 0.10 MPa, and a loss tangent of from 0.40 to 0.20.

8. The anti-reflective film laminate according to claim 6, further comprising:
a protective film on a surface of the antifouling layer on a side opposite to the first transparent base material; and
a release film on a surface of an adhesive layer of the two adhesive layers on a side away from the first transparent base material on a side opposite to the second transparent base material.

9. A product comprising the anti-reflective film laminate according to claim 6.

10. The anti-reflective film laminate according to claim 6, wherein the first transparent base material is a single layer which is optionally surface-treated, and the second transparent base material is a single layer.

* * * * *